US011095632B2

(12) United States Patent
Morgantini et al.

(10) Patent No.: US 11,095,632 B2
(45) Date of Patent: Aug. 17, 2021

(54) COGNITIVE FRAUD PREVENTION

(71) Applicant: International Business Machines Corporation, Armonk, NY (US)

(72) Inventors: Daniele Morgantini, Rome (IT); Giulia Carnevale, Rome (IT); Mariella Galileo, Rome (IT); Domenico Biondi, Rome (IT)

(73) Assignee: International Business Machines Corporation, Armonk, NY (US)

(*) Notice: Subject to any disclaimer, the term of this patent is extended or adjusted under 35 U.S.C. 154(b) by 278 days.

(21) Appl. No.: 16/029,696

(22) Filed: Jul. 9, 2018

(65) Prior Publication Data

US 2020/0014673 A1 Jan. 9, 2020

(51) Int. Cl.
*H04L 29/06* (2006.01)
*H04L 29/08* (2006.01)

(52) U.S. Cl.
CPC .............. *H04L 63/08* (2013.01); *H04L 67/18* (2013.01)

(58) Field of Classification Search
CPC ................................ H04L 63/08; H04L 67/18
USPC .......................................................... 726/16
See application file for complete search history.

(56) References Cited

U.S. PATENT DOCUMENTS 8,788,419 B2    7/2014  Samuels et al.
8,881,263 B2 *  11/2014 Hewinson ............... G06F 16/29
                                                                726/16
2003/0182214 A1  9/2003  Taylor
2008/0275748 A1  11/2008 John
2012/0158541 A1  6/2012  Ganti et al.
(Continued)

FOREIGN PATENT DOCUMENTS

CN        1710904 A    12/2005
CN      104883363 A     9/2015
(Continued)

OTHER PUBLICATIONS

"IBM upgrades banking fraud platform with Cognitive Behavioral Biometrics", Technative, Nov. 2, 2016, <https://www.technative.io/ibm-upgrades-banking-fraud-platform-with-cognitive-behavioral-biometrics/>, 4 pages.
(Continued)

*Primary Examiner* — Dant B Shaifer Harriman
(74) *Attorney, Agent, or Firm* — Stephen R. Yoder; Gilbert Harmon, Jr.

(57) ABSTRACT

A computer implemented method for preventing fraudulent activity on a user account includes analyzing a set of personal information corresponding to a user to identify one or more travel events, wherein each travel event indicates a corresponding timeframe and location, receiving an access attempt made with respect to a user account and a current location corresponding to the access attempt, determining whether the current location corresponds to a location indicated by the one or more identified travel events, analyzing one or more external sources to determine whether the current location is explainable responsive to determining the current location does not correspond to a location indicated by the one or more identified travel events, and denying the received access attempt made with respect to the user account responsive to determining the current location is not explainable.

20 Claims, 4 Drawing Sheets

(56) References Cited

U.S. PATENT DOCUMENTS

| | | | | |
|---|---|---|---|---|
| 2014/0222570 | A1* | 8/2014 | Devolites | G06Q 30/0267 |
| | | | | 705/14.58 |
| 2015/0193768 | A1 | 7/2015 | Douglas et al. | |
| 2016/0330207 | A1 | 11/2016 | Bender et al. | |
| 2017/0134905 | A1* | 5/2017 | Venkatesan | H04W 12/0609 |

FOREIGN PATENT DOCUMENTS

| | | |
|---|---|---|
| CN | 104364794 B | 10/2016 |
| CN | 107548547 A | 1/2018 |
| WO | 0190859 W | 11/2001 |
| WO | 2017218490 A1 | 12/2017 |

OTHER PUBLICATIONS

"Yellow Hammer EFT Fraud Detective ™", jack henry Banking, <https://www.jackhenrybanking.com/information-security-and-risk-management/financial-crimes-solutions/pages/yellow-hammer-eft-fraud-detective.aspx>, printed Apr. 3, 2018, 3 pages.

"The International Search Report and the Written Opinion of the International Searching Authority, or the Declaration", Applicant file reference DE820160449PCT01, International application No. PCT/IB2019/055485, International filing date Jun. 28, 2019, 10 pages.

\* cited by examiner

COGNITIVE FRAUD PREVENTION

BACKGROUND OF THE INVENTION

The present invention relates generally to the field of fraud prevention, and more specifically to selectively enabling user access according to location information.

Banks and other institutions regularly monitor account activity and attempt to assess the validity of various access attempts to confirm it is the rightful account owner who is performing said access attempts. Access attempts by someone other than the account owner could indicate attempted fraud, and need to be flagged and/or denied accordingly. Current systems for determining account activity validity conduct scheduled analysis on the account activity logs to identify any instances of suspicious activity.

SUMMARY

As disclosed herein, a computer implemented method for preventing fraudulent activity on a user account includes analyzing a set of personal information corresponding to a user to identify one or more travel events, wherein each travel event indicates a corresponding timeframe and location, receiving an access attempt made with respect to a user account and a current location corresponding to the access attempt, determining whether the current location corresponds to a location indicated by the one or more identified travel events, analyzing one or more external sources to determine whether the current location is explainable responsive to determining the current location does not correspond to a location indicated by the one or more identified travel events, and denying the received access attempt made with respect to the user account responsive to determining the current location is not explainable. A computer program product and a computer system corresponding to the method are also disclosed.

DETAILED DESCRIPTION

Because of the existing systems' reliance on scheduled analysis of account activity, sometimes suspicious activity may be identified too late (i.e., after some form of fraud has already been committed). In other cases, the systems may not be precise enough or capable of considering a larger picture scenario, leading to the creation of false positives, which can cause a non-hacked bank account to be locked down. Wrongfully freezing an account in this manner could lead to customer dissatisfaction. Disclosed herein is an alert system configured to prevent frauds using real-time analysis based on cognitive power and real-time user information.

The present invention will now be described in detail with reference to the Figures. Implementation of embodiments of the invention may take a variety of forms, and exemplary implementation details are discussed subsequently with reference to the Figures.

Figure 1:
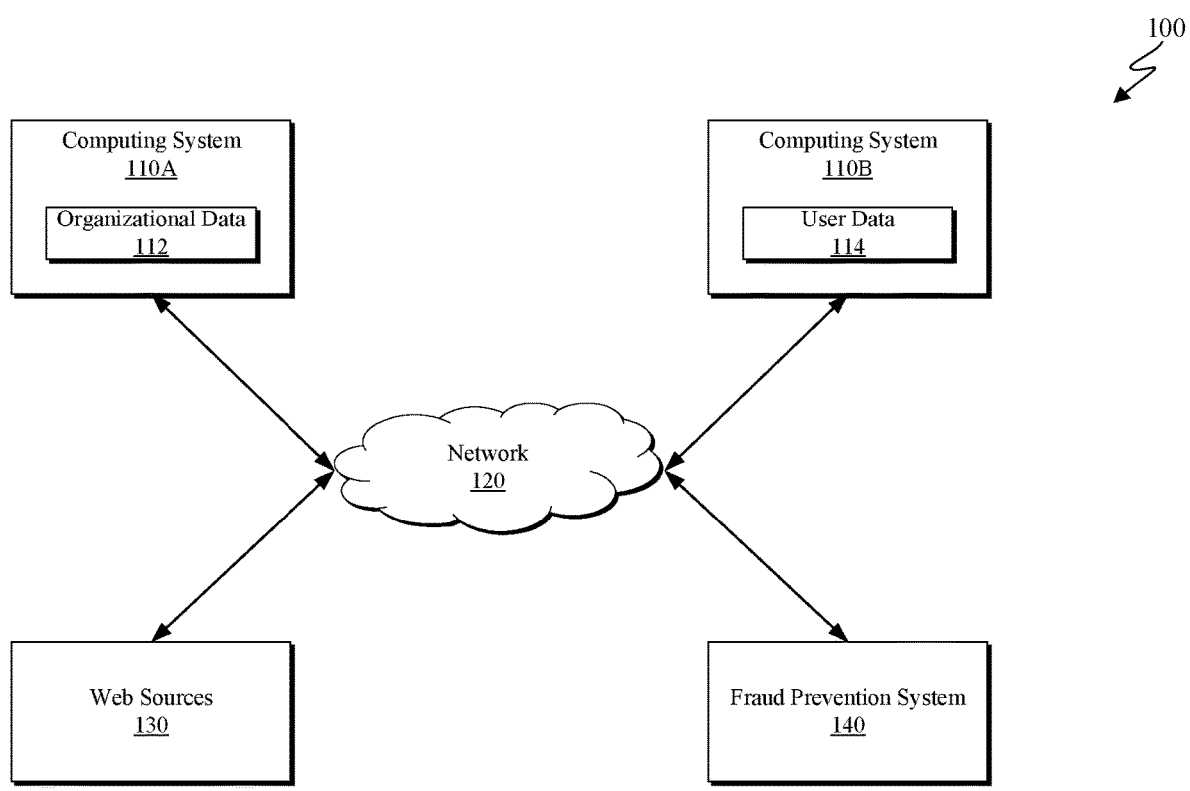
FIG. 1 is a block diagram depicting access analysis system in accordance with at least one embodiment of the present invention.

FIG. 1 is a block diagram depicting access analysis system 100 in accordance with at least one embodiment of the present invention. As depicted, access analysis system 100 includes computing systems 110, network 120, web sources 130, and fraud prevention system 140. Access analysis system 100 may enable identification of fraudulent access attempts based on user information.

Computing systems 110 can each be a desktop computer, laptop computer, specialized computer server, or any other computer system known in the art. In some embodiments, computing systems 110 each represent a computer system utilizing clustered computers and components to act as a single pool of seamless resources. In general, computing systems 110 are each representative of any electronic device, or combinations of electronic devices, capable of executing machine-readable program instructions, as described in greater detail with regard to FIG. 4.

As depicted, computing system 110A includes organizational data 112. Computing system 110A may be a system configured to store and manage proprietary organizational data 112. In some embodiments, organizational data 112 may include structured data corresponding to access timestamps. Organizational data 112 may additionally include location data for one or more access attempts. Organizational data 112 may be organized as logs indicating a time, a location, and a user or individual associated with a set of access attempts. Computing system 110A may be configured to provide organizational data 112 to fraud prevention system 140 via network 120.

Computing system 110B includes user data 114. User data 114 may include both social and personal data corresponding to one or more users. Social data for a user may include data available via a user's various social media profiles, such as instances where a user has checked in to a location via a social media platform, or where a user has indicated via a post, photo, or other associated content that they are in a particular location. A user's personal data may include the content of a user's email and calendar data. User data 114 may additionally include unstructured data containing tickets, hotel reservation information, or other travel information extracted from a user's email, social media, or calendar. Computing system 110B may be configured to provide user data 114 to fraud prevention system 140 via network 120.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between computing systems 110, web sources 130, and fraud prevention system 140 in accordance with an embodiment of the present invention.

Web sources 130 may include any number of applications accessible via the internet capable of providing information to fraud prevention system 140. In at least one embodiment, web sources 130 provide specific information to fraud prevention system 140 responsive to a query for said information from fraud prevention system 140. Web sources 130 may include websites which provide information regarding weather conditions, traffic conditions, flight statuses, or other information which could potentially impact a user's location by impeding/affecting travel, etc. In at least some embodiments, web sources 130 also include social media platforms through which some user information may be received if it is not provided by computing system 110B.

Fraud prevention system 140 can be a desktop computer, laptop computer, specialized computer server, or any other computer system known in the art, similar to computing systems 110A and 110B. In at least one embodiment, fraud prevention system 140, however, is additionally configured to execute an access analysis method to analyze the validity of a user's attempt to access a service. One example of a suitable access analysis method is depicted with respect to FIG. 2. Fraud prevention system 140 may additionally be configured to execute a user location analysis method. One example of a suitable user location analysis method is depicted with respect to FIG. 3.

Figure 2:
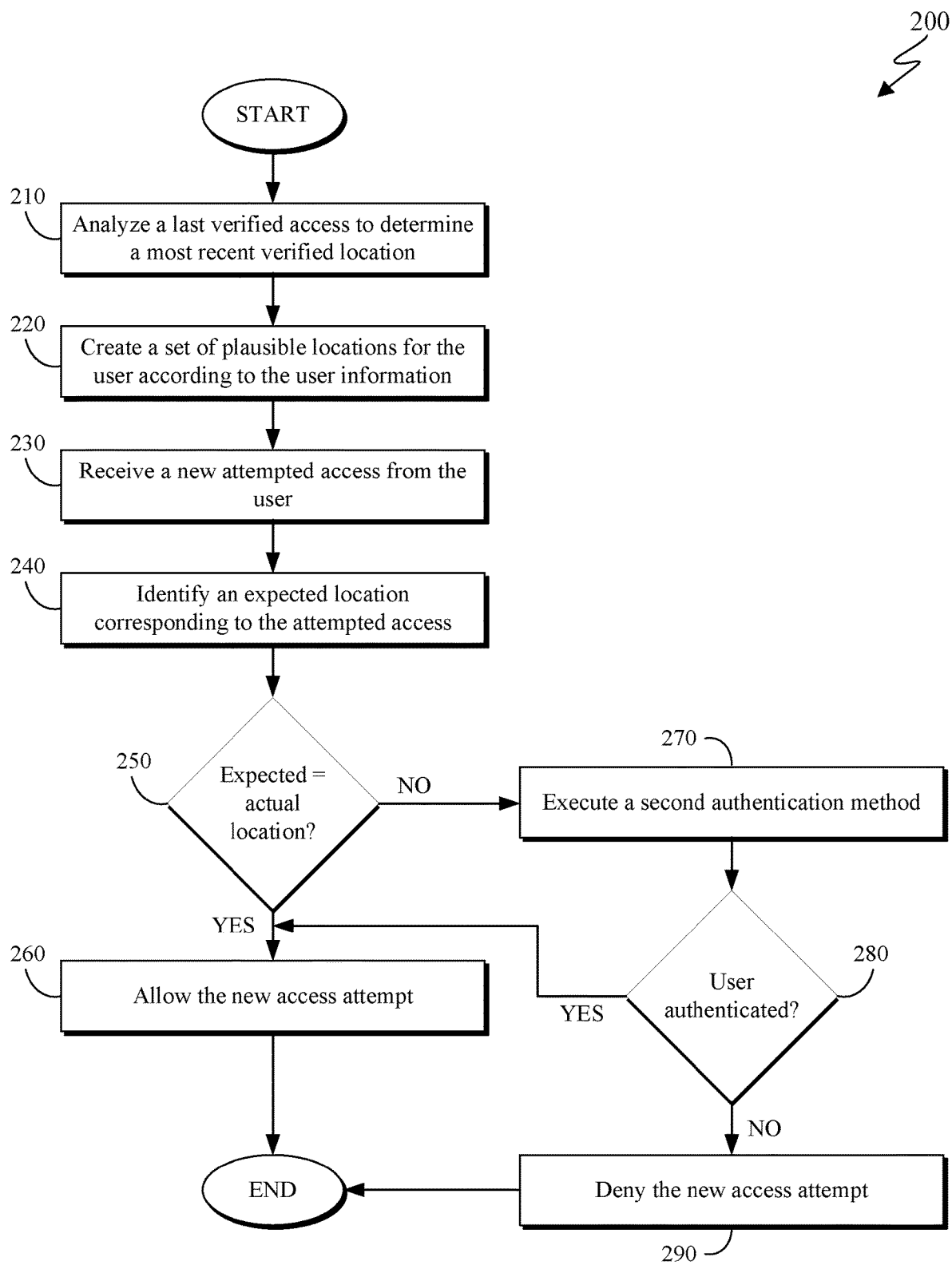
FIG. 2 is a flowchart depicting an access analysis method in accordance with at least one embodiment of the present invention.

FIG. 2 is a flowchart depicting an access analysis method 200 in accordance with at least one embodiment of the present invention. As depicted, access analysis method 200 includes analyzing (210) a last verified access to determine a most recent verified location, creating (220) a set of plausible locations for a user according to a set of user information, receiving (220) a new access attempt from a user, identifying (240) an expected location corresponding to the access attempt, determining (250) whether the expected location and the actual location are the same, allowing (260) the new access attempt, executing (270) a secondary authentication method, determining (280) whether the user has passed the secondary authentication method, and denying (290) the new access attempt. Access analysis method 200 may enable fraud prevention based on whether or not an access attempt occurs at a reasonable location based on a set of user information.

Analyzing (210) a last verified access to determine a most recent verified location may include identifying a most recent time at which a user was granted access to a service of interest. Once a most recent verified (or successful) access is identified, the fraud prevention system analyzes said verified access to identify a location corresponding to the access. This location may be referred to as the most recent verified location, and is indicative of the location where the user most recently passed all fraud checks to receive access. In some embodiments, the system may be configured to skip the following steps and grant immediate access if a user's current location matches the most recent verified location. In other embodiments, the most recent verified location serves as a starting point for determining where a user could have feasibly traveled in the time since his/her most recent access. If no allowed accesses exist (for example, if the user's account is new, etc.), then analyzing (210) a last verified access to determine a most recent verified location may be skipped. In some embodiments, a default location may be indicated when setting up a user account, and in any instance where a most recent verified location cannot be identified, the indicated default location may be used as the de facto most recent verified location. In some embodiments, only access attempts within an indicated time frame may be analyzed to identify a most recent verified location.

Creating (220) a set of plausible locations for a user according to a set of user information may include receiving a set of user information. The user information may include a user's calendar information, email information, account details, and additional social media information discernible from a user's social media profiles. The user information may be specifically directed towards scheduling information, such as where a user has been traveling or will be traveling, as well as when the user has traveled or will travel. User information may include hotel reservations or ticket bookings identifiable via the user's calendar or email, posts on social network platforms, and historical data. Creating (220) a set of plausible locations may additionally include analyzing the received user information to create a user's travel schedule. The created travel schedule may include entries indicating locations a user has already been as well as scheduled engagements the user has in additional locations. For example, the created travel schedule would include an entry corresponding to the location of the last verified access attempt at the time of the last access attempt. The user's travel schedule could also indicate that, according to hotel reservation information extracted from the user's email, the user has traveled to an additional location since the time of the most recent verified access attempt. Therefore, using this additional location as the user's most recent location may be more accurate than using the location of the most recent verified access attempt. Creating (220) a set of plausible locations therefore includes determining a set of locations that the user is expected to be at based on the user information.

It may be unrealistic or inefficient to use an extremely precise definition of a location; for example, slight variants of a set of GPS coordinates may correspond to what is effectively the same location. For this reason, it may be necessary to provide a consistent definition of a location area. In some embodiments, a location radius can be defined with respect to an event type corresponding to a location as well. The event types could indicate how much locational variance is expected with respect to the event; for example, an event tagged as sedentary would correspond to little to no locational variance. A moderately active event would correspond to a minimal amount of location variance, and a highly active event would correspond to a higher amount of locational variance. Each of these categories may be associated with a coefficient utilized in calculating an acceptable location radius. The coefficient may be mathematically combined (multiplied or added or otherwise) with an indicated default location radius to adjust the radius to accommodate the event type. In some embodiments, a secondary coefficient may additionally be created corresponding to a duration of an event. The secondary coefficient may be altered over time; in other words, the secondary coefficient may be configured to shrink over time during the duration of a sedentary event, and to grow over time during the duration of a highly active event to facilitate the nature of these events as they relate to location. If an event corresponds to multiple calculated location areas, a location area encompassing all of them may be generated and used.

Receiving (230) a new access attempt corresponding to a user's account may include detecting an attempt to access a user's account has been made. Receiving (230) a new access attempt corresponding to a user's account may include determining a location corresponding to the new access attempt. Access attempts, as discussed herein, may be made at an ATM, point of sale (POS), or via an app or a website on a mobile device or other computing device. ATM and POS locations correspond to the locations of these physical constructs; the location of a web access via a mobile device or other computing device may be determined according to the IP address of the accessing device. Receiving (230) a new access attempt corresponding to a user's account may additionally include determining whether the user has enhanced fraud protection enabled on their account.

Identifying (240) an expected location corresponding to the new access attempt may include analyzing the created user travel schedule and the set of plausible locations to identify a location at which the user is expected to be. In at least some embodiments, identifying (240) an expected location includes identifying a schedule entry corresponding to the time of the new access attempt. If the schedule entry does not indicate a location, or there is no entry corresponding to the timestamp of the new access attempt, identifying (240) an expected location may include identifying a most recent location indicated by the created user schedule. The location may be identified by name or by GPS coordinate.

Determining (250) whether the expected location and the actual location are the same may include analyzing the expected location and the actual location and determining if they are the same, or at least exist within a reasonable (predefined) vicinity. One example of a more complex algorithm for comparing the expected location and the actual location is discussed with respect to FIG. 3. If it is determined that the expected location and the actual location match (250, yes branch), the method continues by allowing (260) the new access attempt. If it is determined that the expected location and the actual location do not match (250, no branch), the method continues by executing (270) a second authentication method.

Allowing (260) the new access attempt may include granting the user access to the account he/she is attempting to access. In at least some embodiments, allowing (260) the new access attempt includes enabling the point of access to operate normally, be it an ATM, a POS, an app or a web access attempt of the user's account. Allowing (260) the new access attempt may additionally include recording the location associated with the new access attempt as a most recent verified location. In some embodiments, allowing (260) the new access attempt includes recording details of the access in an access log.

Executing (270) a second authentication method may include enabling the user to verify their activity via a secondary mechanism. The second authentication method may include any mechanism through which the user can confirm that he/she is responsible for the access attempt. The second authentication method may be any existing authentication method known in the art, including, but not limited to, password verification, PIN number verification, utilizing a code sent to a user's authorized phone number or email address, prompting the user to answer a security question, or any number of other methods.

Determining (280) whether the user has passed the secondary authentication method may include comparing information a user provided responsive to an authentication prompt to a known correct response. For example, determining (280) whether the user has passed the secondary authentication method may include comparing a PIN number or password the user entered to a stored PIN number or password to verify the access attempt's validity. If it is determined that the user has passed the secondary authentication method (280, yes branch), the method continues by allowing (260) the new access attempt. If it is determined that the user has not passed the secondary authentication method (280, no branch), the method continues by denying (290) the new access attempt.

Denying (290) the new access attempt may include cancelling any account activity associated with the access attempt. For example, in the case of an ATM access attempt, the user will not be allowed to view, withdraw, deposit, or otherwise alter funds in an account if the access attempt is denied. In at least some embodiments, denying (290) the new access attempt additionally includes notifying the managing entity (such as a bank) and/or the user of the denied activity. The denied access attempt may be flagged such that it can be looked into to prevent additional fraudulent activity attempts. Denying (290) the new access attempt may additionally include freezing the account associated with the access attempt until the user has properly validated or authenticated himself/herself.

Figure 3:
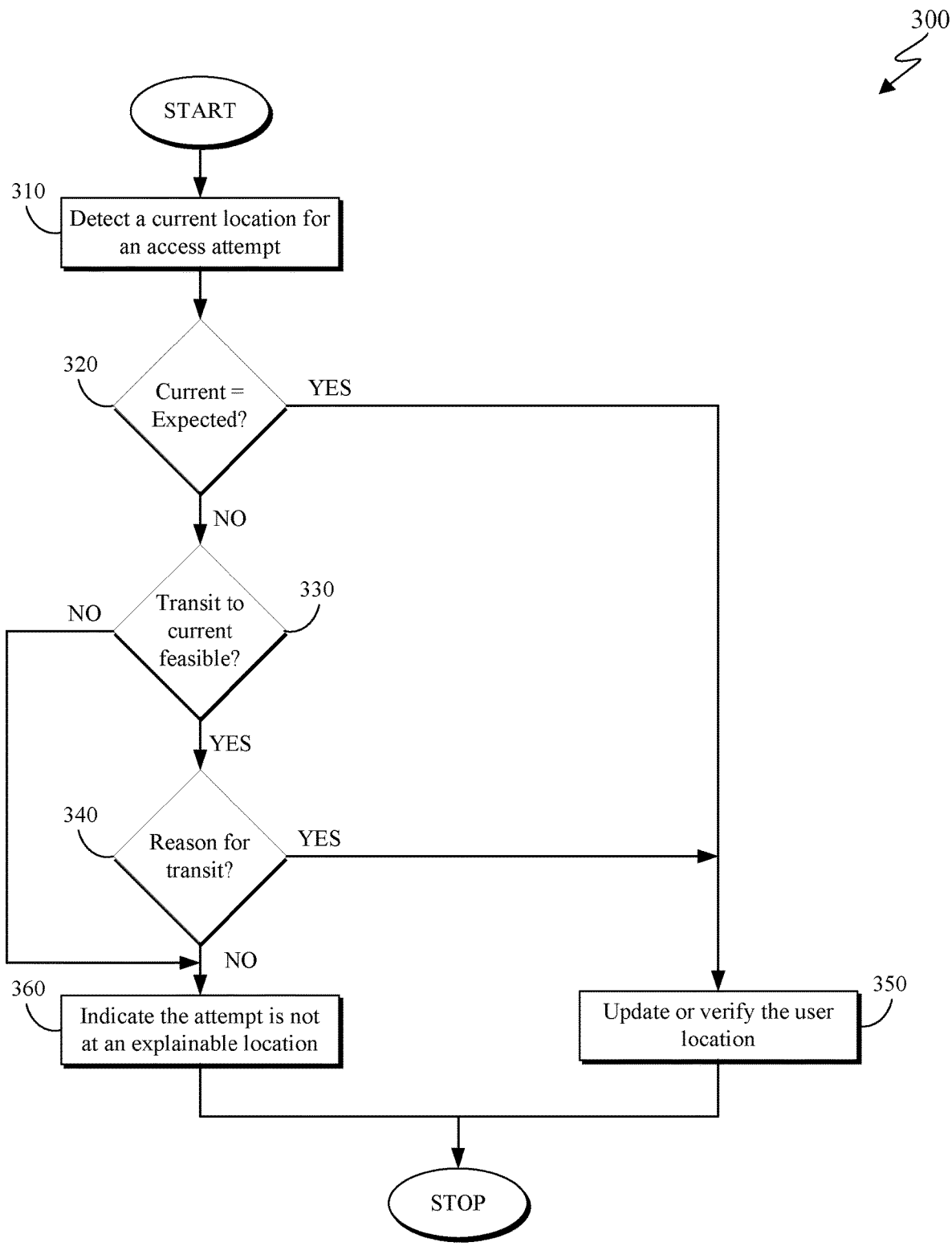
FIG. 3 is a flowchart depicting a user location analysis method in accordance with at least one embodiment of the present invention.

FIG. 3 is a flowchart depicting a user location analysis method 300 in accordance with at least one embodiment of the present invention. As depicted, user location analysis method 300 includes detecting (310) a current location associated with an access attempt, determining (320) whether the current location corresponds to an expected location, determining (330) whether transit to the current location from the expected location is feasible, determining (340) whether a reason for transit to the current location from the expected location exists, updating (350) the user's location, and indicating (360) that the user is not at an explainable location. User location analysis method 300 may enable improved fraud prevention based on whether or not the access attempt is made at a location that the user could logically be at.

Detecting (310) a current location associated with an access attempt may include receiving a new access attempt with respect to a user's account and determining a location corresponding to the new access attempt. Access attempts, as discussed herein, may be made at an ATM, point of sale (POS), or via an app or a website on a mobile device or other computing device. ATM and POS locations correspond to the locations of these physical constructs; the location of a web access via a mobile device or other computing device may be determined according to the IP address of the accessing device. Detecting (310) a current location associated with an access attempt may additionally include receiving one or more expected/plausible locations associated with a current timeframe.

Determining (320) whether the current location corresponds to an expected location may include comparing the current location to the received one or more expected/plausible locations associated with the current timeframe. As discussed previously, the plausible locations may correspond to locations indicated by a user's personal information, such as a user's calendar entries, email information, or social media posts. In some embodiments, the set plausible locations may additionally include a current GPS location corresponding to a user device which has been linked to the user's account. Determining (320) whether the current location corresponds to an expected location may include determining whether the current location falls within a selected distance/radius of the expected location. If it is determined that the current location does match the expected location (320, yes branch), the method continues by updating (350) the user location. If it is determined that the current location does not match the expected location (320, no branch), the method continues by determining (330) whether transit to the expected location is feasible.

Determining (330) whether transit to the current location from the expected location is feasible may include identifying a most recent verified location. Means for determining a user's most recent verified recent location are discussed with respect to step 210 of FIG. 2. Determining (330) whether transit to the current location from the expected location may additionally include identifying how much time passed between the time of the most recent verified location and the time of the access attempt at the current location. In some embodiments, if the amount of time between the time of the most recent verified location and the time of the access attempt at the current location exceeds an indicated threshold, the timeframe between these two access attempts may be disregarded as irrelevant or insignificant. Longer periods of time mean travel to more and more locations becomes feasible, and the radius of feasible travel eventually becomes so wide it may become an inefficient filter. If the amount of time between the time of the most recent verified location and the time of access at the current location does not exceed the indicated threshold, or if no such threshold exists, the system may determine whether travel from the user's most recent verified location to the current location was feasible based on standard means of travel. The system may query airline websites to determine whether a flight path from the most recent verified location to the current location occurred in the given timeframe, as well as determining whether a user could have traveled by other means (i.e., would travel by train, car, boat, etc. have been feasible in the timeframe). If it is determined that transit to the current location was feasible (330, yes branch), the method continues by determining (340) whether there was a reason for transit to the current location. If it is determined that the transit to the current location was not feasible (330, no branch), the method continues by indicating (360) that the access attempt was not made at an explainable location.

Determining (340) whether a reason for transit to the current location from the expected location exists may include analyzing available information to determine whether the user diverted from a planned/expected travel route for a reason. In at least some embodiments, determining (340) whether a reason for transit to the current location exists includes determining whether a user's means of travel (plane, car, train, etc.) was re-routed or delayed for any reason by querying available services corresponding to these various means of travel. The system may query airline websites, traffic reports for areas surrounding the user's most recent location and the current access location, websites monitoring train or subway arrivals and departures, and even weather websites to determine if inclement conditions could have complicated travel. If any of these sources indicate some kind of travel interference, including delays indicated by the sources themselves or the presence of some kind of inclement weather that could have altered the user's travel plans, it is determined that a reason indeed exists for transit to the current location. If it is determined that a reason exists for transit to the current location (340, yes branch), the method continues by updating (350) the user location. If it is determined that no reason exists for transit to the current location, or no such reason can be found (340, no branch), the method continues by indicating the attempt was not made from an explainable location.

Updating (350) the user's location may include updating the set of expected locations according to the newly determined location. In at least some embodiments, updating (350) the user's location includes simply amending the set of expected locations to include the location of the current access attempt. Updating (350) the user's location may additionally include adjusting the set of expected locations according to the discovered information. For example, if a user's travel path has been altered, one or more of the locations additionally included in the set of expected locations may no longer be relevant. If a user's flight was rerouted, he/she may no longer be traveling to the same locations, in which case the locations corresponding to his old flight path may be removed from the set of expected locations. In at least some embodiments, once the system identifies that a user's expected location has been altered by some complication associated with mass travel (airlines being delayed due to a storm, etc.), the system may then identify additional users whose personal information indicates travel that may be similarly affected, and updates their expected locations accordingly.

Indicating (360) that the access attempt was not made at an explainable location may include determining that the access attempt cannot be explained based on the information available. In some embodiments, indicating (360) that the access attempt was not made at an explainable location may include triggering an alert to the user that a potentially fraudulent account access attempt was made. Indicating (360) that the access attempt was not made at an explainable location may additionally include triggering a secondary authentication method by which the user can verify he/she indeed made the access attempt. Appropriate secondary authentication methods are discussed with respect to steps 270 and 280 of FIG. 2.

Consider a user whose personal information, via various emails and calendar entries corresponding to hotel reservations and flight bookings, indicates that the user will be flying from San Francisco to New York. An access attempt is made in Ohio before the user was supposed to have landed in New York, resulting in the access attempt being flagged as suspicious. Via the information in the user's email and calendar entries, including flight numbers and specific airports, the system is able to check the status of the flight, and determines that the plane was forced to land in Ohio due to a storm. The access attempt is therefore validated based on the discovered information.

Figure 4:
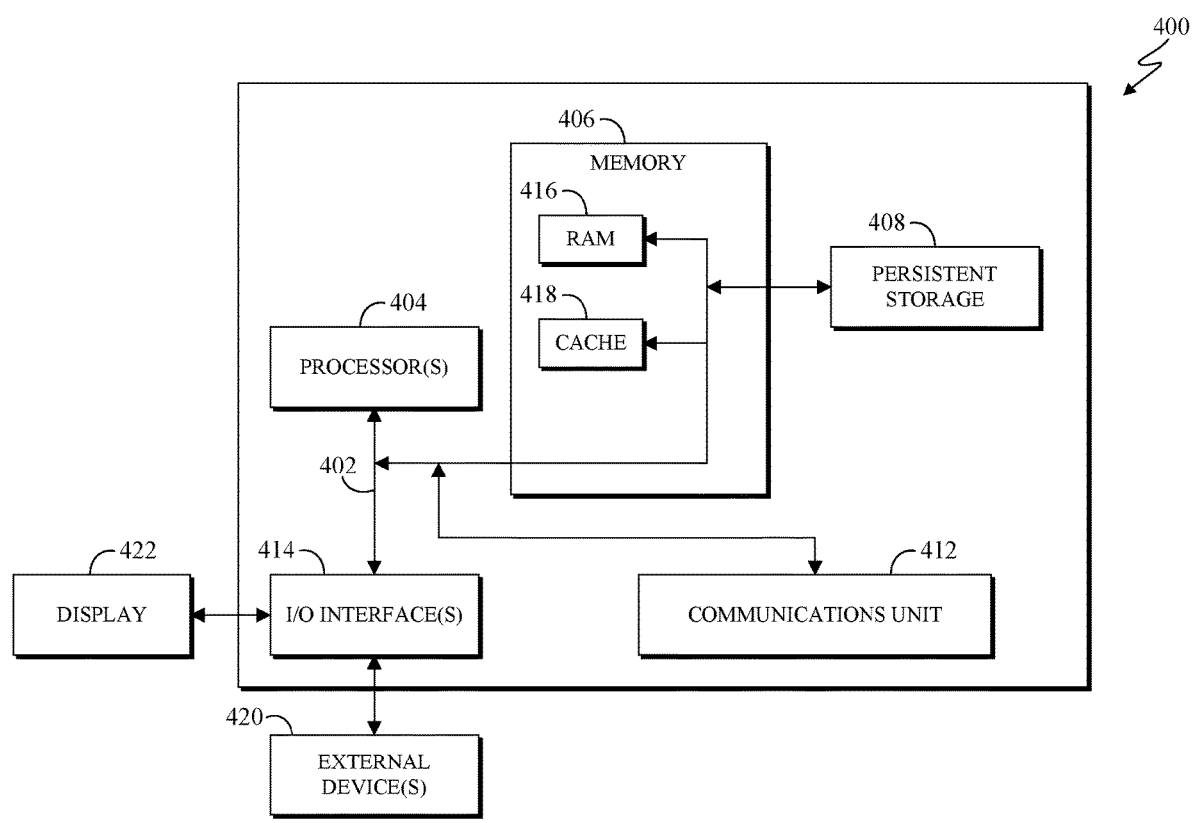
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
    analyzing a set of personal information corresponding to a user to identify one or more travel events, wherein each travel event indicates a corresponding timeframe and location;
    receiving an access attempt made with respect to a user account and a current location corresponding to the access attempt;
    determining whether the current location corresponds to a location indicated by the one or more identified travel events;
    responsive to determining the current location does not correspond to a location indicated by the one or more identified travel events, analyzing one or more external sources to determine whether a reason exists for the user to have traveled from a location indicated by the one or more identified travel events to the current location;
    responsive to determining the current location is not explainable, denying the received access attempt made with respect to the user account.

2. The computer implemented method of claim 1, further comprising:
    responsive to determining the current location is not explainable, executing a secondary authentication method to provide the user access to his account.

3. The computer implemented method of claim 1, wherein the set of personal information includes provided user profile information, email information, calendar information, and social media information.

4. The computer implemented method of claim 1, wherein the one or more external sources correspond to sources containing travel information.

5. The computer implemented method of claim 1, further comprising:
    responsive to determining the current location does not correspond to a location indicated by the one or more identified travel events, identifying one or more causes corresponding to the current location;
    identifying one or more additional users impacted by the one or more identified causes; and
    updating a set of expected locations for each of the identified one or more additional users to include the current location.

6. The computer implemented method of claim 1, further comprising:
    responsive to determining the current location is explainable, allowing the received access attempt made with respect to the user account.

7. The computer implemented method of claim 1, further comprising:
    identifying a most recent verified location and a corresponding timestamp;
    determining whether transit to the current location from the most recent verified location was feasible in the time elapsed since the corresponding timestamp; and
    responsive to determining transit to the current location from the most recent verified location was not feasible, denying the received access attempt made with respect to the user account.

8. A computer program product comprising:
    one or more computer readable storage media and program instructions stored on the one or more computer readable storage media, the program instructions comprising instructions to:
    analyze a set of personal information corresponding to a user to identify one or more travel events, wherein each travel event indicates a corresponding timeframe and location;
    receive an access attempt made with respect to a user account and a current location corresponding to the access attempt;
    determine whether the current location corresponds to a location indicated by the one or more identified travel events;
    responsive to determining the current location does not correspond to a location indicated by the one or more identified travel events, analyze one or more external sources to determine whether a reason exists for the user to have traveled from a location indicated by the one or more identified travel events to the current location;
    responsive to determining the current location is not explainable, deny the received access attempt made with respect to the user account.

9. The computer program product of claim 8, further comprising instructions to:
    responsive to determining the current location is not explainable, execute a secondary authentication method to provide the user access to his account.

10. The computer program product of claim 8, wherein the set of personal information includes provided user profile information, email information, calendar information, and social media information.

11. The computer program product of claim 8, wherein the one or more external sources correspond to sources containing travel information.

12. The computer program product of claim 8, further comprising instructions to:
   responsive to determining the current location does not correspond to a location indicated by the one or more identified travel events, identify one or more causes corresponding to the current location;
   identify one or more additional users impacted by the one or more identified causes; and
   update a set of expected locations for each of the identified one or more additional users to include the current location.

13. The computer program product of claim 8, further comprising instructions to:
   responsive to determining the current location is explainable, allow the received access attempt made with respect to the user account.

14. The computer program product of claim 8, further comprising instructions to:
   identify a most recent verified location and a corresponding timestamp;
   determine whether transit to the current location from the most recent verified location was feasible in the time elapsed since the corresponding timestamp; and
   responsive to determining transit to the current location from the most recent verified location was not feasible, deny the received access attempt made with respect to the user account.

15. A computer system comprising:
   one or more computer processors;
   one or more computer readable storage media;
   program instructions stored on the one or more computer readable storage media, the program instructions comprising instructions to:
   analyze a set of personal information corresponding to a user to identify one or more travel events, wherein each travel event indicates a corresponding timeframe and location;
   receive an access attempt made with respect to a user account and a current location corresponding to the access attempt;
   determine whether the current location corresponds to a location indicated by the one or more identified travel events;
   responsive to determining the current location does not correspond to a location indicated by the one or more identified travel events, analyze one or more external sources to determine whether a reason exists for the user to have traveled from a location indicated by the one or more identified travel events to the current location;
   responsive to determining the current location is not explainable, deny the received access attempt made with respect to the user account.

16. The computer system of claim 15, further comprising instructions to:
   responsive to determining the current location is not explainable, execute a secondary authentication method to provide the user access to his account.

17. The computer system of claim 15, wherein the set of personal information includes provided user profile information, email information, calendar information, and social media information.

18. The computer system of claim 15, further comprising instructions to:
   responsive to determining the current location does not correspond to a location indicated by the one or more identified travel events, identify one or more causes corresponding to the current location;
   identify one or more additional users impacted by the one or more identified causes; and
   update a set of expected locations for each of the identified one or more additional users to include the current location.

19. The computer system of claim 15, further comprising instructions to:
   responsive to determining the current location is explainable, allow the received access attempt made with respect to the user account.

20. The computer system of claim 15, further comprising instructions to:
   identify a most recent verified location and a corresponding timestamp;
   determine whether transit to the current location from the most recent verified location was feasible in the time elapsed since the corresponding timestamp; and
   responsive to determining transit to the current location from the most recent verified location was not feasible, deny the received access attempt made with respect to the user account.

\* \* \* \* \*